United States Patent [19]

Takace

[11] Patent Number: 4,667,917

[45] Date of Patent: May 26, 1987

[54] SEAT PEDESTAL

[75] Inventor: James A. Takace, White Pigeon, Mich.

[73] Assignee: Coachmen Industries, Elkhart, Ind.

[21] Appl. No.: 733,191

[22] Filed: May 13, 1985

[51] Int. Cl.⁴ .............................................. B60N 1/04
[52] U.S. Cl. .................. 248/398; 248/503.1; 248/415; 248/425
[58] Field of Search ............. 248/398, 500, 510, 140, 248/371, 397, 398, 503.1, 415, 425; 297/334, 329, 341, 331, 335, 336, 371, 372.1, 397, 142

[56] References Cited

U.S. PATENT DOCUMENTS

| 1,593,477 | 7/1926 | Speyer. | |
|---|---|---|---|
| 1,639,371 | 8/1927 | Freeman. | |
| 1,732,169 | 10/1929 | Provost | 248/398 |
| 2,005,112 | 6/1935 | Smelker | 248/398 |
| 2,331,060 | 10/1943 | Turner | 248/500 |
| 2,850,081 | 9/1958 | Dillon | 248/397 |
| 2,859,798 | 11/1958 | Carte | 297/329 |
| 3,253,856 | 5/1966 | Ueda. | |
| 3,338,622 | 8/1967 | Bachman. | |
| 3,666,314 | 12/1970 | Makinen et al.. | |
| 3,692,270 | 9/1972 | McAuliffe | 248/397 |
| 3,751,866 | 8/1973 | Renchen | 248/500 |
| 3,879,082 | 4/1975 | Gwin. | |
| 4,052,102 | 10/1977 | Rosenthal | 248/398 |
| 4,194,782 | 3/1980 | Itoh. | |
| 4,372,607 | 2/1983 | Mizushima | 297/331 |
| 4,428,611 | 1/1984 | Widmer. | |

FOREIGN PATENT DOCUMENTS

| 845573 | 6/1970 | Canada | 248/140 |
|---|---|---|---|
| 488470 | 12/1979 | Fed. Rep. of Germany | 248/398 |
| 158056 | 1/1971 | United Kingdom | 297/326 |

Primary Examiner—Ramon S. Britts
Assistant Examiner—Alvin C. Chin-Shue
Attorney, Agent, or Firm—Thomas J. Dodd

[57] ABSTRACT

A pedestal for a rotatable seat which is hingedly connected to a base and which includes a hook part for securing the seat to the pedestal base in an upright seat position.

2 Claims, 6 Drawing Figures

SEAT PEDESTAL

SUMMARY OF THE INVENTION

This invention relates to a seat pedestal, and will have special but not limited application to a pedestal for a van folding seat.

Folding seats are advantageous in vans and other recreational vehicles. They allow easy access to the rear portions of the passenger compartment and are readily stored to allow the van to hold additional cargo. Some examples of folding seats are seen in U.S. Pat. Nos. 1,593,477; 1,639,371; 3,666,314; 3,879,082, and 4,194,782.

The seat pedestal of this invention includes a support member which is hingedly connected to a base to allow the support and its connected seat to be pivoted into a storage position. A lock secures the seat in an operative upright seat position during travel. Also, the support member and connected seat may be removed to allow for maximum use of storage space in the van.

Accordingly, it is an object of this invention to provide for a novel pesestal for a swivel seat.

Another object of this invention is to provide for a hinged seat pedestal which may be locked in its upright seat position.

Another object of this invention is to provide for a hinged seat pedestal which may be easily detached from the pedestal base.

Other objects of this invention will become apparent upon a reading of the following description.

BRIEF DESCRIPTION OF THE DRAWINGS

A preferred embodiment of the invention has been depicted for purposes of illustration wherein.

DESCRIPTION OF THE PREFERRED EMBODIMENT

Figure 1:
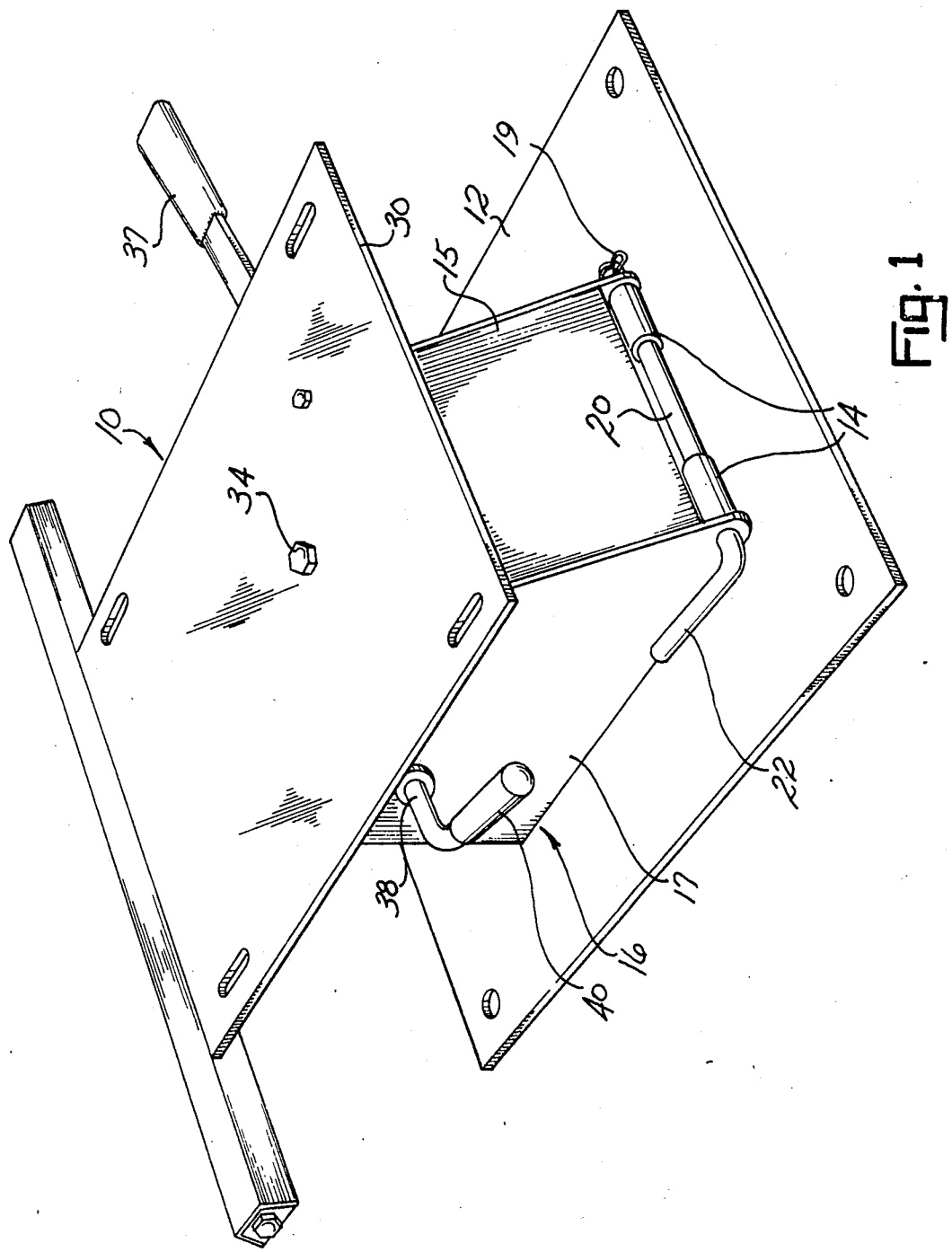
FIG. 1 is a perspective view of the seat pedestal of this invention.

The preferred embodiment herein described is not intended to be exhaustive or to limit the invention to the precise form disclosed. It is chosen and described to explain the principles of the invention and its application and practical use to enable others skilled in the art to utilize the invention.

The seat pedestal 10 shown in the drawings includes a base 12 which is adapted for fastening, such as with mounting bolts, to the floor of a vehicle (not shown). A pair of spaced coaxial tubes 14 form a part of base 12. A support member 16 of the general configuration shown in FIGS. 2-5 and including side walls 17 having coaxial bores 18 and end walls 15 is positioned atop base 12. Tubes 14 of base 12 fit between each side walls 17 of support member 16 in alignment with side wall bores 18. A pivotal rod 20 which terminates in a handle 22 extends through aligned bores 18 and tubes 14 to hingedly fasten support member 16 to base 12. A cotter pin 19 holds rod 20 in position. An inverted U-shaped member 24 is secured by welding to base 12 so as to be positioned between support member side walls 17, as shown in FIGS. 2-6.

Support member 16 includes a table 26 which is carried upon side walls 17 and end walls 15. A bearing 28 or similar swivel-type device is positioned upon table 26. A plate member 30 is positioned upon bearing 28 and is adapted to support a vehicle seat 32 shown in broken lines for illustrative purposes. Plate member 30, bearing 28 and table 26 are held in fixed orientation by a bolt 34 which extends through the plate bearing and table and which is secured by a nut 36 to allow rotation of plate member 30 and seat 32 with respect to base 12. A suitable locking mechanism (not shown) actuated by handle 37 allows for the selected positioning and rotation of seat 32 and plate member 30 upon table 26. A rod 38 extends through support member 14 and terminates in a handle portion 40. Rod 38 is journalled within support member side walls 17. A hook 42 is connected to and depends from rod 38. Hook 42 engages U-shaped member 24 when the support member 16 is in its upright seat position.

Figure 2:
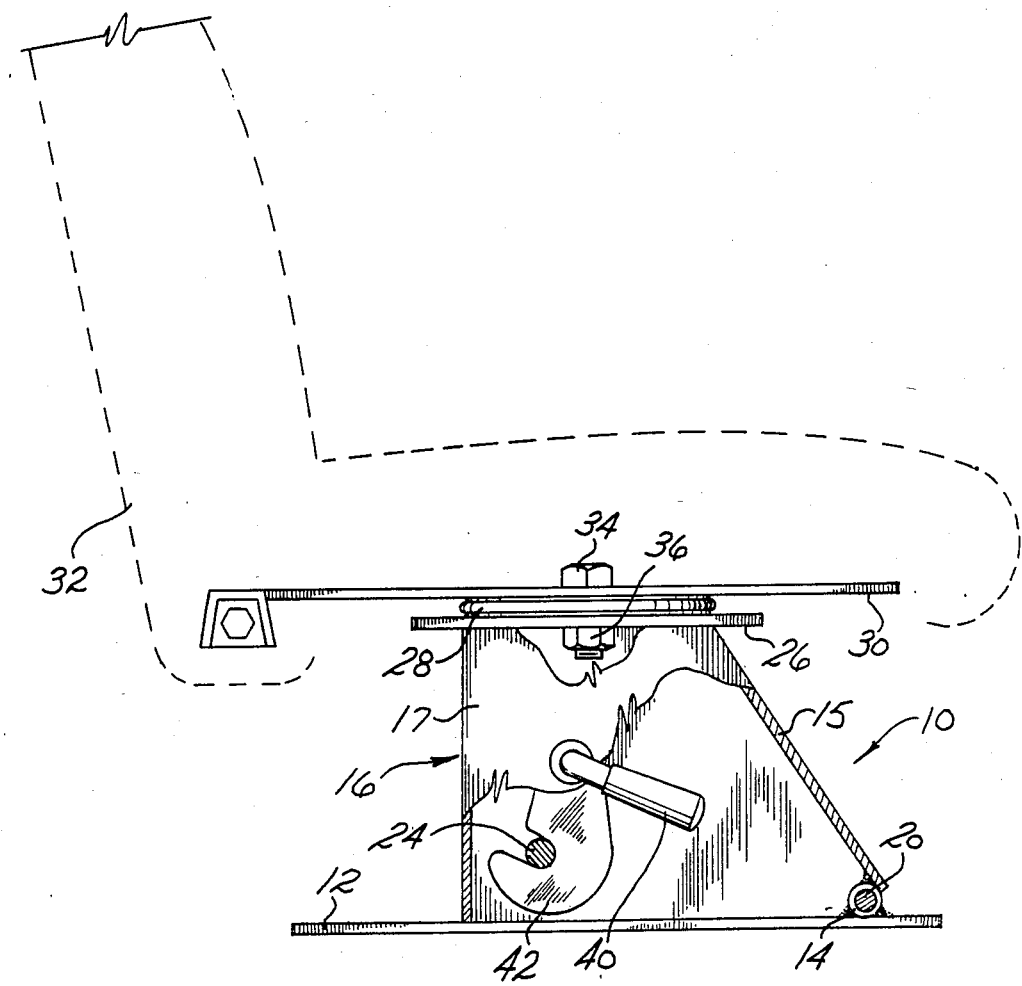
FIG. 2 is a side elevational view of the pedestal with portions cut away and shown in sections for purposes of illustration.
Figure 3:
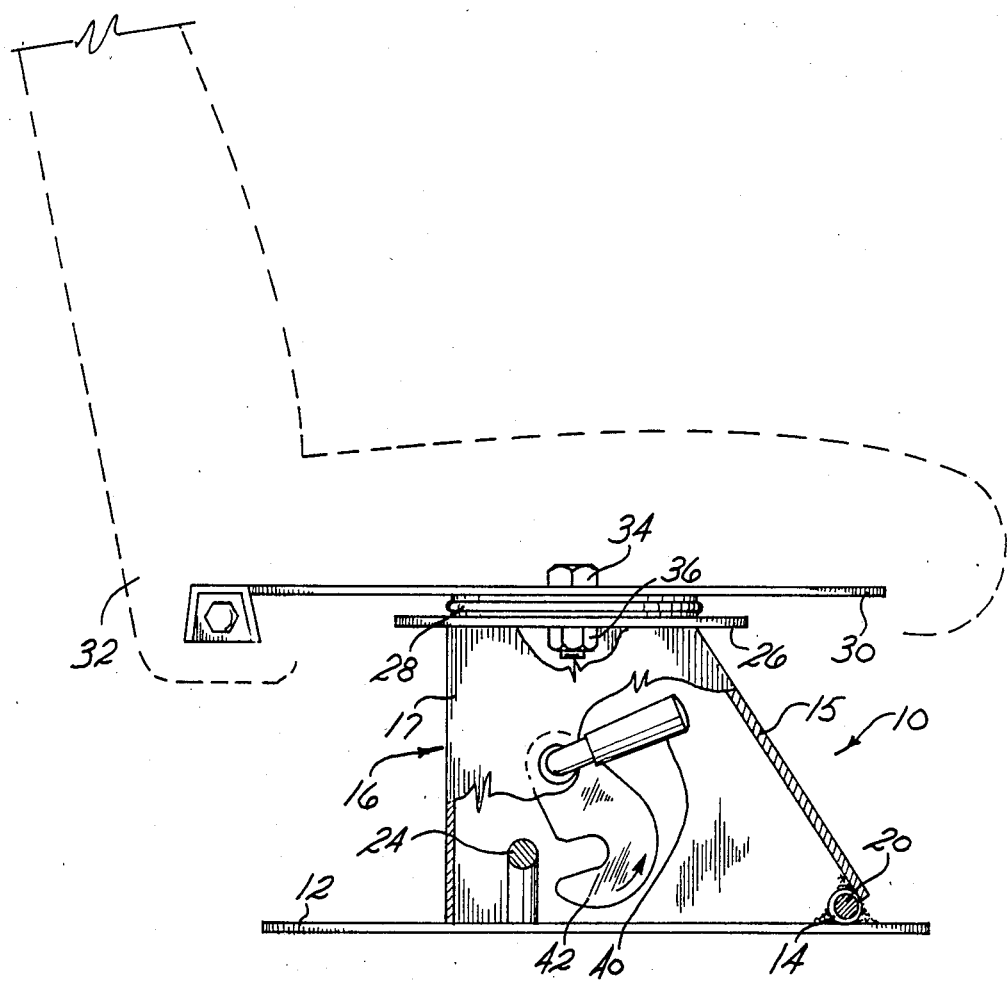
FIG. 3 is a view similar to FIG. 2, showing the hook lock in a release position.
Figure 4:
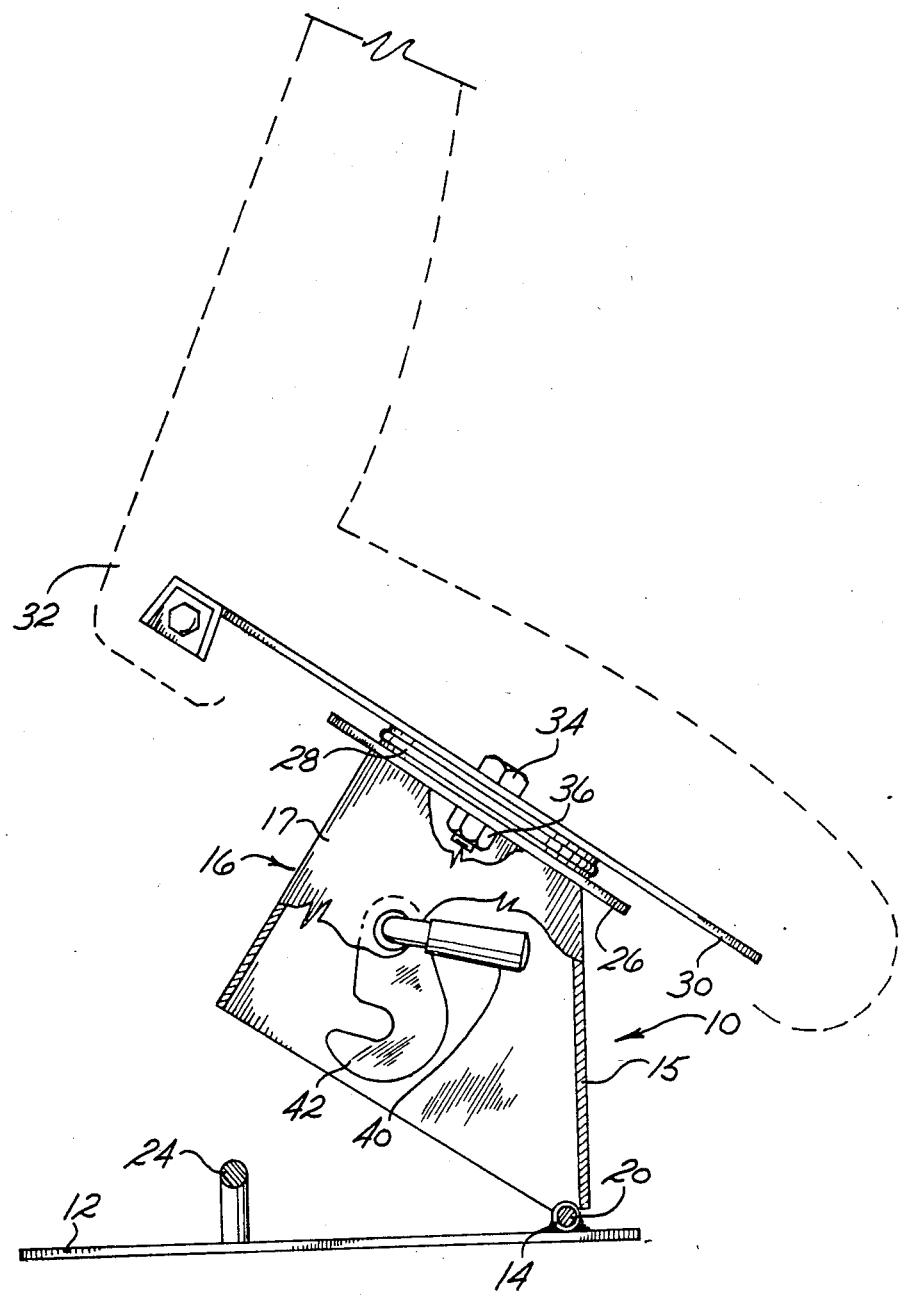
FIG. 4 is a view similar to FIG. 2 showing the seat pedestal support tilted forwardly from the pedestal base.
Figure 5:
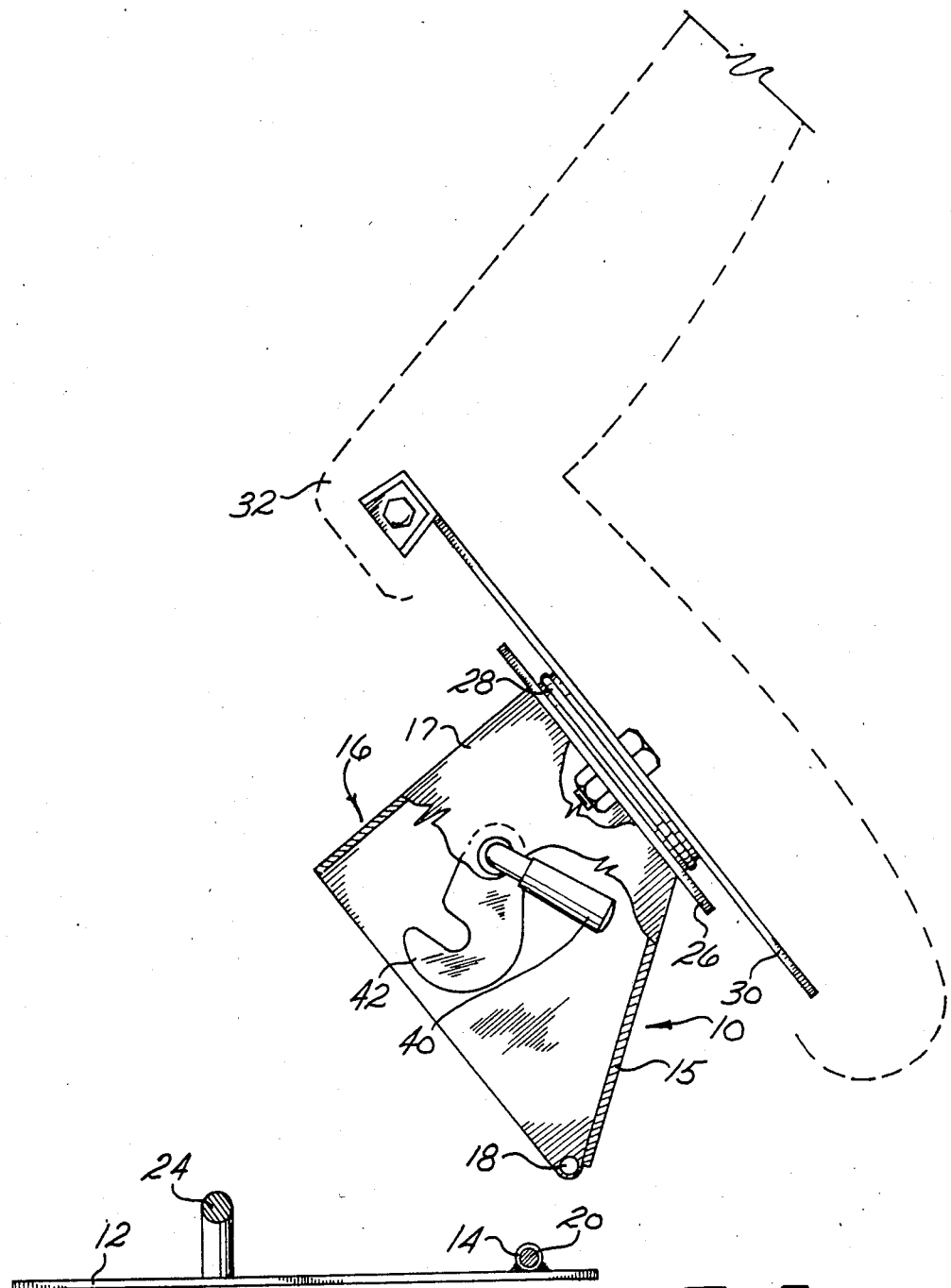
FIG. 5 is a side elevational view showing the pedestal support detached from the pedestal base.
Figure 6:
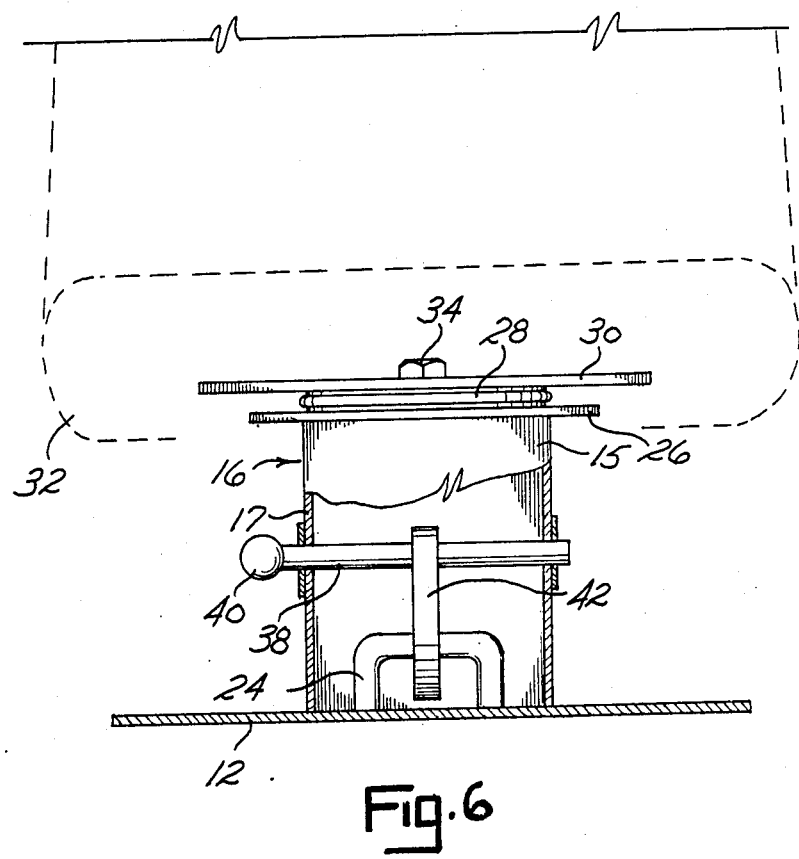
FIG. 6 is a rear elevational view of the pedestal with portions shown in sectional form.

Seat pedestal 10 can be pivoted about rod 20 between its upright seat position shown in FIG. 2 and its tilted position shown in FIG. 4 by turning rod 38 to cause hook 42 to be released from U-shaped member 24 as seen in FIG. 3. Should it be desirable to remove the seat 32 entirely from base 12, cotter pin 19 is removed and hinge rod 20 is pulled until it clears support member side walls 17 and base tubes 14. Support member 16 and connected seat 32 may then be removed from the vehicle providing added storage space for cargo hauling.

It is to be understood that the above description does not limit the invention to the given details, but may be modified within the scope of the appended claims.

I claim:

1. A seat pedestal comprising a base, a support member having first and second end walls, said support member further including first and second side walls connected to said end walls to form an enclosed structure, a pivot connection securing said support member to said base at one of its said first and second end walls wherein said support member is shiftable between an upright seat position and an inoperative tilted position, said support member carrying a rotatable plate adapted to carry a seat, and means carried by said support member for releasably securing the support member in its said upright seat position, said securement means includes a rod journalled in said support member, an inverted U-shaped member extending upwardly from said base and positioned within said enclosed structure to conceal the inverted U-shaped member from the outside, and a hook connected to and depending from said rod, said hook constituting means for engaging said concealed U-shaped member when the support member is in its upright seat position, means for turning said rod to shift said hook from engagement with said U-shaped member.

2. The seat pedestal of claim 1 wherein said pivot connection includes a removable pintel rod engaging said base and support member and constituting means when removed permitting separation of the support member from the base.

* * * * *